United States Patent
Schermanz et al.

(10) Patent No.: US 10,780,426 B2
(45) Date of Patent: Sep. 22, 2020

(54) USE OF VANADATES AS OXIDATION CATALYSTS

(71) Applicant: TREIBACHER INDUSTRIE AG, Treibach-Althofen (AT)

(72) Inventors: Karl Schermanz, Launsdorf (AT); Lars Hensgen, Klagenfurt (AT); Amod Sagar, Althofen (AT); Alessandro Trovarelli, Pagnacco (IT); Marzia Casanova, Ravascletto (IT)

(73) Assignee: TREIBACHER INDUSTRIE AG, Treibach-al-Thofen (AT)

( * ) Notice: Subject to any disclaimer, the term of this patent is extended or adjusted under 35 U.S.C. 154(b) by 50 days.

(21) Appl. No.: 16/331,080

(22) PCT Filed: Sep. 12, 2017

(86) PCT No.: PCT/EP2017/072893
§ 371 (c)(1),
(2) Date: Mar. 6, 2019

(87) PCT Pub. No.: WO2018/050639
PCT Pub. Date: Mar. 22, 2018

(65) Prior Publication Data
US 2019/0193058 A1    Jun. 27, 2019

(30) Foreign Application Priority Data
Sep. 15, 2016 (EP) .................................. 16188998

(51) Int. Cl.
| | | |
|---|---|---|
| *B01D 53/94* | (2006.01) |
| *B01J 23/847* | (2006.01) |
| *B01J 23/00* | (2006.01) |
| *B01J 37/04* | (2006.01) |
| *B01J 37/03* | (2006.01) |
| *B01J 37/08* | (2006.01) |
| *F01N 3/20* | (2006.01) |

(52) U.S. Cl.
CPC ........ *B01J 23/8472* (2013.01); *B01D 53/944* (2013.01); *B01J 23/002* (2013.01); *B01J 37/03* (2013.01); *B01J 37/04* (2013.01); *B01J 37/08* (2013.01); *F01N 3/2066* (2013.01); *B01D 2255/206* (2013.01); *B01D 2255/2092* (2013.01); *B01D 2255/2096* (2013.01); *B01D 2255/20723* (2013.01); *B01D 2255/20738* (2013.01); *B01D 2255/40* (2013.01); *B01J 2523/00* (2013.01); *B01J 2523/31* (2013.01); *B01J 2523/3706* (2013.01); *B01J 2523/3712* (2013.01); *B01J 2523/3775* (2013.01); *B01J 2523/54* (2013.01); *B01J 2523/55* (2013.01); *B01J 2523/842* (2013.01)

(58) Field of Classification Search
None
See application file for complete search history.

(56) References Cited

U.S. PATENT DOCUMENTS

| | | | |
|---|---|---|---|
| 4,137,259 A | 1/1979 | Van Geem et al. | |
| 2011/0150731 A1* | 6/2011 | Schermanz | B01J 23/8472 423/239.1 |

FOREIGN PATENT DOCUMENTS

| | | |
|---|---|---|
| DE | 10 2014 110937 A1 | 2/2016 |
| EP | 2 878 359 A1 | 6/2015 |
| WO | 2010121280 A1 | 10/2010 |
| WO | 2011127505 A1 | 10/2011 |
| WO | 2013179129 A2 | 12/2013 |

\* cited by examiner

*Primary Examiner* — Anita Nassiri-Motlagh
(74) *Attorney, Agent, or Firm* — Workman Nydegger

(57) ABSTRACT

Use of a ternary vanadate of formula (I): $Fe_x MeI_y MeII_z VO_4$ wherein MeI and MeII are different from each other and each stand for an element selected from the group consisting of Y, La, Ce, Pr, Nd, Sm, Er, Gd, Tb, Dy, Ho, Tm, Yb, Lu, Al, Bi and Sb and wherein x=0.05-0.9; y=0.05-0.9; z=0.05-0.9; x+y+z=1, as a catalyst for the oxidation of carbonaceous compounds in combustion engines.

10 Claims, No Drawings

USE OF VANADATES AS OXIDATION CATALYSTS

The present invention relates to novel vanadate based catalyst compositions for oxidation of carbonaceous compounds in combustion engines, particularly in diesel engines. These novel catalysts are superior over prior art catalysts in view of their thermal stability, as well as in view of their catalytic efficiency in oxidative reactions, especially in soot oxidation. In the following, the abbreviation "DPF" is employed for the term "diesel particulate filters."

Such catalyst compositions may be used in diesel engines of mobile applications such as automotive and non-road applications, but are also useable in stationary applications.

BACKGROUND OF THE INVENTION

Caused by their operation characteristics, combustion engines produce along with exhaust gases also a variety of particulates (mostly soot out of the fuel/air mix due to incomplete combustion). Exhaust gases have been shown to have a variety of negative effects on public health and natural environment and several strategies are applied to reduce their harmfulness, including an SCR (selective catalytic reduction) approach. But since also the emerging particulates are considered harmful, soot containing exhaust gases are usually channeled through an appropriate filter that is able to retain and collect those particulates. However, during operation soot particles accumulate in the filter, leading to an undesirable increase in the back pressure of the exhaust system, thereby decreasing efficiency. To regenerate the filter, soot particles have to be removed, which can elegantly be realized by their combustion at high temperatures. One major drawback of this solution is often the limited temperature stability of catalytic components inside the filter.

The basic concept of treating exhaust gases of combustion engines with vanadium-based catalysts has been known for a very long time. For instance GB 413.744, which was already filed in 1933, discloses the use of vanadium oxide and metallic vanadates as high-temperature catalysts for the removal of carbon monoxide and other constituents of exhaust gases produced by combustion engines.

Furthermore, the use of vanadium-based catalysts for the catalysis of reductive treatment of exhaust gases, such as especially selective catalytic reduction (SCR) of nitrogen oxides, has also been discussed in various documents of the prior art.

Thus, WO 2011/127505 discloses vanadium-based SCR catalysts with the general formula $XVO_4$ (whereas X denotes either Bi, Sb, Ga or Al, alone or mixtures with transition metals and/or rare earth elements (REE)) in combination with a Ti-based support. In this context also WO 2010/121280 is mentionable, as it also discloses catalysts with an $XVO_4$ composition, wherein X denotes either transition metals or mixtures of transition metals with REE, again in combination with a Ti-based support. Such catalysts are reported to show enhanced $NO_x$ conversion activity and enhanced thermal stability.

DE 102014110937 (A1) discloses vanadate-based SCR-catalysts with the general formula $Al_xFe_yVO_4$ (x+y=1 and x, y>0) that do not contain any REE. An exemplary catalyst with a composition of $Al_{0.5}Fe_{0.5}VO_4$ is therein reported to have better $NO_x$ conversion at a certain range of temperatures in comparison to $V_2O_5$ based catalyst. However, any information about the stability of the described composition in high temperature environment remains undisclosed.

Also catalytic compositions for the use in a filter unit as SCR-catalysts to detoxify exhaust gases of the general formula $(A_x)(T_y)(R_z)VO_4$ (x+y+z=1 and x,y,z≥0), wherein A is an alkaline earth metal, T is a transition metal and R is an REE are known in prior art and disclosed by e.g. WO 2013/179129 A2.

Also the application of mixtures containing vanadium pentoxide ($V_2O_5$) as a catalyst for treatment of exhaust gas from diesel engines is known in prior art. For instance, EP 0 154 145 discloses a DPF unit for diesel engines with catalysts comprising $V_2O_5$ in combination with Li, Na, K, Rb, Cs, Mg, Ca, Sr, Ba, B, Al, Si, Sn, Sb, Bi, Cu, Ag, Zn, Sc, Y, La, Ce, Pr, Nd, Tb, Ti, Zr, Hf, Nb, Cr, Mo, W, Mn, Re, Fe, Co or Ni. Such catalysts are supposed to improve ignition and combustion of particulates.

Some research data has also been published by Casanova et al., 2013 ("Preliminary investigation of bi-functional vanadate-based catalysts in $NH_3$-SCR and soot combustion reactions", 11$^{th}$ European congress on catalysis—Europa Cat-XI, Lyon, France, Sep. 1-6, 2013). In this work an investigation of different SCR-catalysts and supports for their potential bifunctional application in SCR and regeneration of DPF is described. The publication discloses comparative data for soot oxidation activity of catalytic compositions comprising $Fe_{0.5}Er_{0.5}VO_4$ and $FeVO_4$ in combination with different supports.

M. Casanova has further elaborated on this topic in a presentation held on Sep. 2, 2013 at the Europa Cat conference in Lyon. According to this presentation, the combination of SCR and DPF into a single application is highly desirable and, while the soot oxidation reaction is not influenced by SCR, SCR is clearly influenced by soot oxidation. While this presentation generally mentions ternary vanadates of the formula $Fe_{(y)}Al_{(x-y)}RE_{(1-x)}VO_4$, where RE stands for a rare earth metal, citing WO 2011/127505, the presentation is silent about the use of any such vanadates for oxidative catalysis.

Further prior art documents disclose alkali-vanadates (U.S. Pat. No. 4,515,758), cerium-vanadates (EP 1.515.012), silver-vanadates (EP 0.077.524), alkaline earth metal-vanadates (EP 1.368.107), as well as copper-vanadates (U.S. Pat. No. 4,711,870) to be used as catalysts for soot oxidation. EP 2 878 359 A1 as well as U.S. Pat. No. 4,137,259 A can be mentioned as additional prior art.

It is the object of the present invention to provide catalyst compositions containing vanadates which are highly effective in oxidative reactions, such as soot oxidation and show an increased thermal stability.

This object is solved by the use of a ternary vanadate of formula (I)

$$Fe_x MeI_y MeII_z VO_4 \qquad (I),$$

wherein MeI and MeII are different from each other and each stand for an element selected from the group consisting of Y, La, Ce, Pr, Nd, Sm, Er, Gd, Tb, Dy, Ho, Tm, Yb, Lu, Al, Bi and Sb and wherein x is 0.05-0.9, y is 0.05-0.9, and z is 0.05-0.9 x+y+z=1, as a catalyst for the oxidation of carbonaceous compounds in combustion engines.

Preferred embodiments of the present invention are disclosed in the dependent claims.

DETAILED DESCRIPTION OF THE INVENTION

Surprisingly it has been discovered that ternary vanadates as defined above show unexpected positive effects for oxidation of diesel exhaust particulates in the catalytic oxidation of (diesel) soot.

Specifically, the compounds used according to the present invention show a better catalytic activity (expressed as a lower $T_{50}$-value) compared with state of the art materials e.g. with $FeVO_4$ or $CeVO_4$, preferably in comparison to both $FeVO_4$ and $CeVO_4$, which may be defined as reference materials. The $T_{50}$-value is defined as the temperature at which 50% (w/w) of soot in a mixture containing catalyst and soot is oxidized.

Furthermore, the compounds used according to the present invention also show a better thermal stability compared with aged state of the art materials. The term "thermal stability" according to the present invention means the catalytic activity characterized by the $T_{50}$-value of the catalyst compositions measured after thermal ageing.

The thermal ageing of the compositions of the present invention is performed in the range between 700° C. to 850° C./10 h, more preferably 750° C.-850° C./10 h, most preferably 800° C.-850° C./10 h.

The thermal stability of these thermally aged compositions of the present invention is better compared to e.g. thermally aged $FeVO_4$ or thermally aged $CeVO_4$, preferably in comparison to both thermally aged $FeVO_4$ and thermally aged $CeVO_4$, which may be defined as reference materials. Better catalytic activity and, especially, better thermal stability allows a safer use in industrial applications and might also improve longevity of the catalysts.

According to the present invention, the ternary vanadates of formula (I) are used in oxidation catalysts. The functioning principle of an oxidation catalyst relies on its capability to catalyze oxidation of carbonaceous compounds using oxygen or other oxidizing agents. The carbonaceous compounds can be e.g. soot, carbon monoxide, dioxins, methane, NMHC (non-methane hydrocarbons), methanol, NMVOC (non-methane volatile organic compounds), aromatic hydrocarbons, preferably soot, dioxin and methane, more preferably soot and dioxin and most preferably soot.

The vanadates used according to the present invention can be prepared as solid-solid solution, physical mixtures and combinations thereof.

For the purpose of the present specification and claims, the term "rare earth element" (REE) means a rare earth element or a mixture thereof, e. g. more than one rare earth element. According to IUPAC a rare earth metal is an element from the fifteen lanthanides, as well as scandium and yttrium.

In a preferred embodiment of the present invention in the above-indicated formula MeI and MeII each stands for an element selected from the group consisting of Y, La, Ce, Pr, Er, Al and Bi. Even more preferably, MeI and MeII each stands for an element selected from the group consisting of Ce, La, Er, Al and Bi.

The present invention also refers to the use of ternary vanadates as oxidation catalysts of general formula $Fe_x MeI_y MeII_z VO_4$, wherein MeI and MeII are selected from the group of the following combinations:

MeI=La, MeII=Er
MeI=Ce, MeII=Al
MeI=Ce, MeII=Bi
MeI=La, MeII=Al
MeI=Er, MeII=Al
MeI=Bi, MeII=Al.

In a further preferred embodiment, in the ternary vanadates of formula (I)
x is 0.1-0.8
y is 0.1-0.8,
z is 0.1-0.8,
x+y+z=1.

In a further preferred embodiment,
x is 0.2-0.6
y is 0.2-0.6
z is 0.2-0.6,
x+y+z=1.

Particularly, in a preferred embodiment of the present invention the ternary vanadate used according to the present invention is selected from the group consisting of $Fe_{0.33}Ce_{0.34}Al_{0.33}VO_4$
$Fe_{0.5}Ce_{0.25}Al_{0.25}VO_4$
$Fe_{0.33}Ce_{0.34}Bi_{0.33}VO_4$
$Fe_{0.25}Ce_{0.5}Bi_{0.25}VO_4$
$Fe_{0.25}Ce_{0.25}Bi_{0.5}VO_4$
$Fe_{0.5}La_{0.25}Er_{0.25}VO_4$
$Fe_{0.33}La_{0.34}Al_{0.33}VO_4$
$Fe_{0.33}Er_{0.34}Al_{0.33}VO_4$
$Fe_{0.33}Al_{0.33}Bi_{0.34}VO_4$.

In a further preferred embodiment of the present invention these ternary vanadate used according to the present invention exhibit $T_{50}$ values of 450° C. or below, more preferably $T_{50}$-values of 440° C. or below, most preferably $T_{50}$ of 430° C. or below after calcination at 650° C. for 2 hours.

The ternary vanadates employed according to the present invention can be prepared in a manner as known to the skilled artisan, such as from WO 2011/127505 A1.

The ternary vanadates employed according to the present invention are preferably prepared by means of a co-precipitation synthesis. The stoichiometric amounts of the nitrates of the elements to be included in the formulation were dissolved in deionized water to yield a mixed metal nitrate solution. Bismuth nitrate hydrate ($Bi(NO_3)_3*5 H_2O$) represented an exception because not being soluble in water it had to be dissolved in an acidic solution containing $HNO_3$. Another aqueous solution was simultaneously prepared with the stoichiometric amount of ammonium metavanadate ($NH_4VO_3$) at 80° C. The two solutions were combined under continuous stirring and the pH adjusted by addition of ammonia solution. The precipitate so formed was further stirred, filtered, washed several times with deionized water and dried at 120° C. overnight. The dried material was calcined at 650° C. for 2 hours.

Ternary vanadates can also be synthesized by solid phase reactions or physical mixtures of vanadates.

In a further preferred embodiment of the present invention the ternary vanadate according to the present invention is employed in combination with a further compound selected from oxides or oxide precursors of Al, Ti, Ce, Zr and mixtures thereof.

The further compound can also be doped (up to 20%) with one or more rare earth elements other than cerium.

Oxide precursors for Al are for example boehmite, aluminium hydroxide, aluminium nitrate, aluminium chloride and others, preferably boehmite and aluminium hydroxide, most preferably boehmite.

Oxide precursors of Ti are for example: metatitanic acid, titanyl sulfate, titanium chloride and others, preferably metatitanic acid.

Oxide precursors of Zr are for example: zirconium hydroxide, zirconyl hydroxide, zirconyl nitrate, zirconium nitrate, zirconyl carbonate, zirconium basic carbonate, zirconyl chloride and others, preferably zirconium hydroxide and zirconyl hydroxide.

Oxide precursors of Ce are for example: cerium hydroxide, cerium chloride, cerium hydrate, cerium sol, cerium nitrate, cerium carbonate, cerium oxalate, cerium ammonium nitrate and others, preferably cerium hydroxide, cerium hydrate and cerium sol.

More preferred is the use with this further compound comprising $TiO_2$ or $Al_2O_3$ or $Ce_aZr_{(1-a)}O_2$, such as $Ce_{0.75}Z_{0.25}O_2$ or mixtures thereof.

The ratio of the vanadates and the further compound should be between 100:0 and 10:90 by weight, more preferably 100:0 and 30:70 by weight and most preferably 100:0 and 50:50 by weight.

Finally, in yet another aspect of the present invention the ternary vanadates of formula (I) are used for oxidative exhaust gas catalysis, especially for soot oxidation.

The present invention will now be explained in more detail with reference to examples and comparative examples without being limited to these. Temperatures indicated are in degree Celsius (° C.).

Synthesis

Example 1—$Fe_{0.33}Ce_{0.34}Al_{0.33}VO_4$ $Fe_{0.33}Ce_{0.34}Al_{0.33}VO_4$ was prepared by the co-precipitation method. To obtain 3000 mg of powder catalysts, 1847.2 mg of ammonium metavanadate $NH_4VO_3$ (AMV) (Sigma Aldrich, Vienna) were dissolved in 157.9 g distilled water at 80° C. in order to obtain a 0.1 mol/l solution; a second solution was prepared by dissolving 2105.2 mg of iron nitrate nonahydrate $Fe(NO_3)_3 \cdot 9H_2O$ (Treibacher Industrie AG (TIAG), Althofen), 2331.6 mg of cerium nitrate hexahydrate $Ce(NO_3)_3 \cdot 6H_2O$ (TIAG, Althofen) and 1954.7 mg of aluminium nitrate nonahydrate $Al(NO_3)_3 \cdot 9H_2O$ (Sigma Aldrich, Vienna) in 157.9 g of distilled water. The two solutions were mixed under continuous stirring and pH was adjusted to 7 with the addition of aqueous ammonia solution (28 vol %). This caused the precipitation of a brown compound ($Fe_{0.33}Ce_{0.34}Al_{0.33}VO_4$) which was filtered off, washed several times with distilled water and dried at 100° C. overnight and calcined at 650° C. for 2h under air in a muffle furnace.

Example 2 to 9

The compositions referred to examples 2 to 9 are as disclosed in Tables 1A and 1B below and were prepared analogously to the procedure as disclosed in example 1 but with the different appropriate starting materials and amounts. The quantities of the starting materials used for the preparation according to Examples 2 to 9 are listed in Tables 1A and 1B. In case of vanadates containing Bi 0.2 ml of nitric acid were added to the mixed metal solution.

TABLE 1a

| Ex. | Composition | AMV [g] | $Fe(NO_3)_3 \cdot 9H_2O$ [g] | $Al(NO_3)_3 \cdot 9H_2O$ [g] | $Ce(NO_3)_3 \cdot 6H_2O$ [g] |
|---|---|---|---|---|---|
| 1 | $Fe_{0.33}Ce_{0.34}Al_{0.33}VO_4$ | 1.8472 | 2.1052 | 1.9547 | 2.3316 |
| 2 | $Fe_{0.5}Ce_{0.25}Al_{0.25}VO_4$ | 1.9000 | 3.2808 | 1.5231 | 1.7634 |
| 3 | $Fe_{0.33}Ce_{0.34}Bi_{0.33}VO_4$ | 1.4082 | 1.6534 | | 1.7251 |
| 4 | $Fe_{0.25}Ce_{0.5}Bi_{0.25}VO_4$ | 1.3965 | 1.2057 | | 2.5922 |
| 5 | $Fe_{0.33}Er_{0.34}Al_{0.33}VO_4$ | 1.7628 | 2.0088 | 1.8652 | |
| 6 | $Fe_{0.33}La_{0.34}Al_{0.33}VO_4$ | 1.8524 | 2.1111 | 1.9603 | |
| 7 | $Fe_{0.33}Bi_{0.34}Al_{0.33}VO_4$ | 1.6454 | 1.8752 | 1.7413 | |
| 8 | $Fe_{0.25}Ce_{0.25}Bi_{0.5}VO_4$ | 1.3076 | 1.1290 | | 1.2135 |
| 9 | $Fe_{0.5}La_{0.25}Er_{0.25}VO_4$ | 1.5999 | 2.7627 | | |

TABLE 1b

| Ex. | Composition | $Er(NO_3)_3 \cdot 6H_2O$ [g] | $Bi(NO_3)_3 \cdot 5H_2O$ [g] | $La(NO_3)_3 \cdot 6H_2O$ [g] | $H_2O$ for AMV [g] | $H_2O$ for Nitrates [g] |
|---|---|---|---|---|---|---|
| 1 | $Fe_{0.33}Ce_{0.34}Al_{0.33}VO_4$ | | | | 157.9 | 157.9 |
| 2 | $Fe_{0.5}Ce_{0.25}Al_{0.25}VO_4$ | | | | 162.4 | 162.4 |
| 3 | $Fe_{0.33}Ce_{0.34}Bi_{0.33}VO_4$ | | 1.9272 | | 120.4 | 120.4 |
| 4 | $Fe_{0.25}Ce_{0.5}Bi_{0.25}VO_4$ | | 1.4479 | | 119.4 | 119.4 |
| 5 | $Fe_{0.33}Er_{0.34}Al_{0.33}VO_4$ | 2.3635 | | | 150.7 | 150.7 |
| 6 | $Fe_{0.33}La_{0.34}Al_{0.33}VO_4$ | | | 2.3313 | 158.4 | 158.4 |
| 7 | $Fe_{0.33}Bi_{0.34}Al_{0.33}VO_4$ | | 2.3198 | | 140.7 | 140.7 |
| 8 | $Fe_{0.25}Ce_{0.25}Bi_{0.5}VO_4$ | | 2.7112 | | 111.8 | 111.8 |
| 9 | $Fe_{0.5}La_{0.25}Er_{0.25}VO_4$ | 1.5775 | | 1.4806 | 136.8 | 136.8 |

Example 10 Physical Mixture of 0.33 $FeVO_4$, 0.34 $CeVO_4$, 0.33 $AlVO_4$

For a physical mixture of single calcined vanadates the net weight of the single calcined vanadates were calculated to achieve the final formal composition $Fe_{0.33}Ce_{0.34}Al_{0.33}VO_4$. $FeVO_4$ was prepared as described in comparative example 5. $CeVO_4$ was prepared as described in comparative example 2. $AlVO_4$ was prepared in the same manner using 2471.9 mg AMV and 211.3 g of distilled water and 7926.3 mg $Al(NO_3)_3*9\ H_2O$ and 211.3 g of distilled water.

The corresponding mixture was obtained by mixing 890.4 mg of calcined $FeVO_4$, 1369.8 mg calcined $CeVO_4$ and 739.8 mg calcined $AlVO_4$ in a mortar for 10 minutes. After mixing no additional calcination was performed.

Example 11 Physical Mixture of 0.25 $FeVO_4$, 0.5 $CeVO_4$, 0.25 $BiVO_4$

For a physical mixture of single calcined vanadates the net weight of the single calcined vanadates were calculated to achieve the final formal composition $Fe_{0.25}Ce_{0.5}Bi_{0.25}VO_4$. $FeVO_4$ was prepared as described in comparative example 5. $CeVO_4$ was prepared as described in comparative example 2. $BiVO_4$ was prepared in the same manner using 1083.0 mg AMV and 92.6 g of distilled water and 4491.6 mg $Bi(NO_3)_3*5H_2O$, 0.2 ml of nitric acid and 92.6 g of distilled water.

The corresponding mixture was obtained by mixing 509.9 mg of calcined $FeVO_4$, 1523.0 mg calcined $CeVO_4$ and 967.1 mg calcined $BiVO_4$ in a mortar for 10 minutes. After mixing no additional calcination was performed.

Comparative Example 1—$Ce_{0.5}Al_{0.5}VO_4$ $Ce_{0.5}Al_{0.5}VO_4$ was prepared by the co-precipitation method. To obtain 3000 mg of powder catalysts, 1767.4 mg of ammonium metavanadate $NH_4VO_3$ (Aldrich) were dissolved in 151.1 g of distilled water at 80° C. in order to obtain a 0.1 mol/l solution; a second solution was prepared by dissolving 2833.7 mg of aluminium nitrate nonahydrate $Al(NO_3)_3.\ 9H_2O$ (Aldrich) and 3280.6 mg of cerium nitrate hexahydrate $Ce(NO_3)_3.\ 6H_2O$ (Treibacher) in 151.1 g of distilled water at 80° C. The two solutions were mixed under continuous stirring and pH was adjusted to 7 with the addition of aqueous ammonia solution (28 vol %). This caused the precipitation of a light brown compound ($Ce_{0.5}Al_{0.5}VO_4$) which was filtered off, washed several times with distilled water, dried at 100° C. overnight and calcined at 650° C. for 2h under air in a muffle furnace.

Comparative Example 2 to 6

The compositions referred to as comparative examples 2 to 6 are disclosed in Tables 2A and 2B below and were prepared analogously to the procedure as disclosed in comparative example 1 but using appropriate starting material and amounts. The quantities of the starting materials used for the preparation according to comparative examples 2 to 6 are as listed in Tables 2A and 2B. In case of vanadates containing Bi 0.2 ml of nitric acid were added to the mixed metal solution.

TABLE 2A

| Comp. Ex. | Composition | AMV [g] | $Fe(NO_3)_3*9$ $H_2O$ [g] | $Al(NO_3)_3*9$ $H_2O$ [g] | $Ce(NO_3)_3*6$ $H_2O$ [g] |
|---|---|---|---|---|---|
| 1 | $Ce_{0.5}Al_{0.5}VO_4$ | 1.7674 | | 2.8337 | 3.2806 |
| 2 | $CeVO_4$ | 1.3754 | | | 5.1061 |
| 3 | $Er_{0.5}La_{0.5}VO_4$ | 1.3089 | | | |
| 4 | $Fe_{0.5}Al_{0.5}VO_4$ | 2.2453 | 3.8772 | 3.6001 | |
| 5 | $FeVO_4$ | 2.0540 | 7.0937 | | |
| 6 | $Fe_{0.3}La_{0.7}VO_4$ | 1.5324 | 1.5876 | | |

TABLE 2B

| Comp. Ex. | Composition | $Er(NO_3)_3*6H_2O$ [g] | $Bi(NO_3)_3*5H_2O$ [g] | $La(NO_3)_3*6H_2O$ [g] | $H_2O$ for AMV [g] | $H_2O$ for Nitrates [g] |
|---|---|---|---|---|---|---|
| 1 | $Ce_{0.5}Al_{0.5}VO_4$ | | | | 151.1 | 151.1 |
| 2 | $CeVO_4$ | | | | 117.6 | 117.6 |
| 3 | $Er_{0.5}La_{0.5}VO_4$ | 2.5814 | | 2.4227 | 111.9 | 111.9 |
| 4 | $Fe_{0.5}Al_{0.5}VO_4$ | | | | 191.9 | 191.9 |
| 5 | $FeVO_4$ | | | | 175.6 | 175.6 |
| 6 | $Fe_{0.3}La_{0.7}VO_4$ | | | 3.9710 | 131.0 | 131.0 |

Comparative Example 7-8.4% FeVO$_4$/ 91.6% DT 58

Mixture made by slurry synthesis 8.4 wt. % FeVO$_4$/DT-58 (TiO$_2$/SiO$_2$/WO$_3$ 81/10/9 weight %) purchased from Cristal, Thann)

To obtain 3000 mg of catalyst, 252 mg of FeVO$_4$ (prepared as described in comparative example 5) and 2748 mg of DT-58 (TiO$_2$/SiO$_2$/WO$_3$ (81/10/9 weight %) from Cristal) were mixed in distilled water under continuous stirring at ca. 100° C. After slow evaporation of water a wet cake was obtained. The catalyst was obtained after calcination at 650° C./2h.

Comparative Example 8-50% FeVO$_4$/50% DT 58

Mixture made by slurry synthesis 50 wt. % FeVO$_4$/DT-58
To obtain 3000 mg of catalyst, 1500 mg of FeVO$_4$ (prepared as described in comparative example 5) and 1500 mg of DT-58 (TiO$_2$/SiO$_2$/WO$_3$ (81/10/9 weight %) purchased from Cristal, Thann) were mixed in distilled water under continuously stirring at ca. 100° C. After slow evaporation of water a wet cake was obtained. The catalyst was obtained after calcination at 650° C./2h.

Comparative Example 9—Physical Mixture of 0.3 FeVO$_4$, 0.7 LaVO$_4$

For a physical mixture of single calcined vanadates the net weight of the single calcined vanadates were calculated to achieve the final formal composition Fe$_{0.3}$La$_{0.7}$VO$_4$. FeVO$_4$ was prepared as described in comparative example 5. LaVO$_4$ was prepared in the same manner using 1382.0 mg AMV and 118.1 g of distilled water and 5116.0 mg lanthanum nitrate hexahydrate La(NO$_3$)$_3$*6H$_2$O and 118.1 g of distilled water.

The corresponding mixture was obtained by mixing 671.4 mg of calcined FeVO$_4$ and 2328.6 mg calcined LaVO$_4$ in a mortar for 10 minutes. After mixing no additional calcination was performed.

Conditions for Catalytic Powder Testing
Sample Preparation and Thermal Ageing

The synthesized and calcined (650° C./2h) vanadates of the present invention were milled manually in an agate mortar. Powdered samples and carbon black (CB, Printex U) (Evonik Degussa GmbH, Essen) were carefully mixed in an agate mortar in a mass ratio of 20:1 for ten minutes until the mixture was homogeneous to result in a tight contact mode.

Optionally thermal ageing was employed to the powdered samples prior to mixing with carbon black. Ageing of samples was performed for 10 hours in a conventional muffle oven with a heating rate of 10° C./min at either 800° C. or 850° C. as indicated in table 3 below.

Measurement of the Catalytic Activity

Soot oxidation activity was determined by thermogravimetry analysis (TGA) (Q500, TA Instruments) under ambient atmosphere. Each sample (soot+catalyst, ca. 20 mg) was placed in a small flat Pt crucible and the total gas flow was set to 60 ml/min. The samples were pretreated for 1 h at 120° C. in order to desorb water. The soot combustion activities of the catalysts were measured under dynamic conditions with a heating ramp of 10° C./min in a temperature range of from 25° C. to 800° C. The temperature at which 50% of weight loss is observed (T$_{50}$, corresponding to removal of 50% of soot) was used as a measure of catalytic activity.

The results of catalytic activity tests performed with the compounds obtained according to the examples above with or without previous thermal ageing are summarized in the following table:

TABLE 3

| Sample | Composition | T$_{50}$ [° C.] (calcined 650° C./2 h) | T$_{50}$ [° C.] (calcined 650° C./2 h + aged 800° C./10 h) | T$_{50}$ [° C.] (calcined 650° C./2 h + aged 850° C./10 h) |
| --- | --- | --- | --- | --- |
| Example 1 | Fe$_{0.33}$Ce$_{0.34}$Al$_{0.33}$VO$_4$ | 431 | 421 | 399 |
| Example 2 | Fe$_{0.5}$Ce$_{0.25}$Al$_{0.25}$VO$_4$ | 434 | | |
| Example 3 | Fe$_{0.33}$Ce$_{0.34}$Bi$_{0.33}$VO$_4$ | 417 | | |
| Example 4 | Fe$_{0.25}$Ce$_{0.5}$Bi$_{0.25}$VO$_4$ | 400 | | |
| Example 5 | Fe$_{0.33}$Er$_{0.34}$Al$_{0.33}$VO$_4$ | 422 | 406 | 399 |
| Example 6 | Fe$_{0.33}$La$_{0.34}$Al$_{0.33}$VO$_4$ | 434 | 409 | |
| Example 7 | Fe$_{0.33}$Bi$_{0.34}$Al$_{0.33}$VO$_4$ | 418 | | |
| Example 8 | Fe$_{0.25}$Ce$_{0.25}$Bi$_{0.5}$VO$_4$ | 412 | | |
| Example 9 | Fe$_{0.5}$La$_{0.25}$Er$_{0.25}$VO$_4$ | 437 | | |
| Example 10 | Fe$_{0.33}$Ce$_{0.34}$Al$_{0.33}$VO$_4$*) | 439 | | |
| Example 11 | Fe$_{0.25}$Ce$_{0.5}$Bi$_{0.25}$VO$_4$*) | 419 | | |
| Comparative Example 1 | Ce$_{0.5}$Al$_{0.5}$VO$_4$ | 465 | | |
| Comparative Example 2 | CeVO$_4$ | 487 | | |
| Comparative Example 3 | Er$_{0.5}$La$_{0.5}$VO$_4$ | 519 | | |
| Comparative Example 4 | Fe$_{0.5}$Al$_{0.5}$VO$_4$ | 463 | | |
| Comparative Example 5 | FeVO$_4$ | 452 | 437 | 464 |
| Comparative Example 6 | Fe$_{0.3}$La$_{0.7}$VO$_4$ | 456 | | |
| Comparative Example 7 | FeVO$_4$ (8.4%)/DT-58**) | 520 | | |

TABLE 3-continued

| Sample | Composition | $T_{50}$ [° C.] (calcined 650° C./2 h) | $T_{50}$ [° C.] (calcined 650° C./2 h + aged 800° C./10 h) | $T_{50}$ [° C.] (calcined 650° C./2 h + aged 850° C./10 h) |
|---|---|---|---|---|
| Comparative Example 8 | $FeVO_4$ (50%)/DT-58**) | 474 | | |
| Comparative Example 9 | $Fe_{0.3}La_{0.7}VO_4$*) | 485 | | |

*)made via physical mixture without calcination of the final product (educts were calcined)
**)DT-58 = $TiO_2/SiO_2/WO_3$ (81/10/9 weight %)

The invention claimed is:

1. Use A method of catalytically oxidizing carbonaceous compounds from a combustion engine, comprising:
contacting a catalyst comprising a ternary vanadate of formula (I) with carbonaceous compounds from the combustion engine:

$$Fe_x MeI_y MeII_z VO_4 \qquad (I),$$

wherein MeI and MeII are different from each other and each stand for an element selected from the group consisting of Y, La, Ce, Pr, Nd, Sm, Er, Gd, Tb, Dy, Ho, Tm, Yb, Lu, Al, Bi and Sb and wherein
x=0.05-0.9
y=0.05-0.9
z=0.05-0.9
x+y+z=1,
the catalyst catalysing oxidation of the carbonaceous compounds from the combustion engine.

2. The method according to claim 1, wherein MeI and MeII each stand for an element selected from the group consisting of Y, La, Ce, Pr, Er, Al, Bi.

3. The method according to claim 1, that wherein MeI and MeII each stand for an element selected from the group consisting of Ce, La, Er, Al and Bi.

4. The method according to claims 1 to 3, characterized in wherein MeI and MeII are selected from the group of the following combinations:
MeI=La, MeII=Er,
MeI=Ce, MeII=Al,
MeI=Ce, MeII=Bi,
MeI=La, MeII=Al,
MeI=Er, MeII=Al, and
MeI=Bi, MeII=Al.

5. The method according to claims 1, wherein
x=0.1-0.8
y=0.1-0.8
z=0.1-0.8
x+y+z=1.

6. The method according to claim 5, wherein
x=0.2-0.6
y=0.2-0.6
z=0.2-0.6
x+y+z=1.

7. The method according to claim 1 wherein the ternary vanadate is selected from the group consisting of:
$Fe_{0.33}Ce_{0.34}Al_{0.33}VO_4$,
$Fe_{0.5}Ce_{0.25}Al_{0.25}VO_4$,
$Fe_{0.33}Ce_{0.34}Bi_{0.33}VO_4$,
$Fe_{0.25}Ce_{0.5}Bi_{0.25}VO_4$,
$Fe_{0.25}Ce_{0.25}Bi_{0.5}VO_4$,
$Fe_{0.5}La_{0.25}Er_{0.25}V_4$,
$Fe_{0.33}La_{0.34}Al_{0.33}V_{O4}$,
$Fe_{0.33}Er_{0.34}Al_{0.33}V_{O4}$, and
$Fe_{0.33}Al_{0.33}Bi_{0.34}V_{O4}$.

8. The method according to claim 1, wherein the ternary vanadate is employed in combination with another compound selected from oxides, oxide precursors of Al, Ti, Ce, Zr, and mixtures thereof.

9. A method of catalytically oxidizing exhaust gas from a combustion engine, comprising:
contacting a catalyst comprising a ternary vanadate of formula (I) with exhaust gas from the combustion engine:

$$Fe_x MeI_y MeII_z VO_4 \qquad (I),$$

wherein MeI and MeII are different from each other and each stand for an element selected from the group consisting of Y, La, Ce, Pr, Nd, Sm, Er, Gd, Tb, Dy, Ho, Tm, Yb, Lu, Al, Bi and Sb and wherein
x=0.05-0.9
y=0.05-0.9
z=0.05-0.9
x+y+z=1,
the catalyst promoting oxidation of the exhaust gas from the combustion engine.

10. The method according to claim 9, the catalyst promoting oxidation of soot in the exhaust gas.

* * * * *

UNITED STATES PATENT AND TRADEMARK OFFICE
CERTIFICATE OF CORRECTION

PATENT NO. : 10,780,426 B2
APPLICATION NO. : 16/331080
DATED : September 22, 2020
INVENTOR(S) : Schermanz et al.

Page 1 of 1

It is certified that error appears in the above-identified patent and that said Letters Patent is hereby corrected as shown below:

On the Title Page

Item (73), Assignee, change "Treibach-al-Thofen (AT)" to –Treibach-Althofen (AT)–

In the Specification

Column 1
Line 65, change "to $V_2O_5$" to –to a $V_2O_5$–

Column 4
Line 26, change "vanadate" to –vanadates–

Column 5
Line 22, change "degree" to –degrees–

Column 6
Line 10, change "and pH" to –and the pH–

Column 7
Line 24, change "were" to –was–

In the Claims

Column 11
Line 16, remove [Use]

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*